United States Patent [19]

Szymczak

[11] Patent Number: 5,039,140
[45] Date of Patent: Aug. 13, 1991

[54] WELLHEAD JOINT AND SEALING RING

[75] Inventor: Edward J. Szymczak, Spring, Tex.

[73] Assignee: Cooper Industries, Inc., Houston, Tex.

[21] Appl. No.: 396,908

[22] Filed: Aug. 22, 1989

[51] Int. Cl.$^5$ .............................................. F16L 25/00
[52] U.S. Cl. ................................... 285/334.2; 285/917
[58] Field of Search ............................ 285/334.2, 917; 277/236

[56] References Cited

U.S. PATENT DOCUMENTS

| | | | |
|---|---|---|---|
| 806,156 | 12/1905 | Marshall | 285/334.2 X |
| 3,062,565 | 11/1962 | Word | 285/334 L X |
| 3,507,506 | 4/1970 | Tillman | 285/334.2 X |
| 3,877,730 | 4/1975 | Frantz | 285/334.2 X |
| 4,214,763 | 7/1980 | Latham | 277/236 X |
| 4,471,965 | 9/1984 | Jennings et al. | 277/236 X |
| 4,747,606 | 5/1988 | Jennings | 277/236 X |
| 4,766,956 | 8/1988 | Smith et al. | 166/182 |
| 4,795,200 | 1/1989 | Tung | 285/917 X |

Primary Examiner—Dave W. Arola

[57] ABSTRACT

The improved joint of the present invention includes a wellhead housing and its complementary member forming the joint and they include surfaces which taper both inwardly and away from the joint surfaces together with straight cylindrical sealing surfaces extending away from the inner end of the tapered surfaces. One form of improved seal includes a sealing ring having a tubular body with an external flange or hub to be clamped between the joint surfaces of the joint members, tapered external surfaces which mate with and provide a tight sealing engagement with the tapered surfaces of the joint members and tubular rims extending away from the tapered surfaces and having sufficient length to protect the straight cylindrical sealing surfaces of the joint members. A modified form of improved seal includes a sealing ring having a tubular body with an external flange to be clamped between the joint surfaces of the joint members, and tubular rims terminating in an external rounded portion having a short annular flat sealing surface thereon for engaging the straight cylindrical sealing surfaces of the joint members at a position spaced axially from the tapered sealing surfaces of the joint members.

6 Claims, 3 Drawing Sheets

WELLHEAD JOINT AND SEALING RING

BACKGROUND

Problems have been encountered in the sealing of tubular members, such as a blowout preventer, a production tree or a side outlet valve, to a wellhead housing during drilling and subsequently upon completion of the well. Typically, metal gaskets or sealing rings have been used which provide tapered surfaces on the exterior of the ring for sealing against tapered surfaces of the joint members. Such tapered sealing surfaces normally require at least a slight coining between the ring and the sealing surfaces of the joint members for proper sealing between the two joint members.

When seating on cylindrical sealing surfaces has been attempted, often the surfaces have been damaged during the drilling operations and this prevents an effective seal when the production tree is later installed on the wellhead housing.

U.S. Pat. No. 4,214,763 discloses a seal for use between the tapered surfaces in recesses of abutting tubular members and includes a seal ring having an inner bore, end surfaces, tapered sealing surfaces extending outwardly and converging toward each other from the outer portion of the end surfaces and a relieved area intermediate said sealing surfaces with a tapered alignment surface midway between the end surfaces.

U.S. Pat. No. 4,471,965 discloses in FIG. 3 a sealing element which includes a ring having a central bore, and outer sealing projections at each end of the ring adapted to engage the sealing surfaces of the recess defined in the inner ends of the abutting tubular members. FIG. 2 of this references illustrates another type of seal which includes a ring which projects within the bores of the abutting tubular members being connected and includes upper and lower outer sealing projections which are to seal against the interior of the tubular members and a central outer projections which is to be clamped between the facing surfaces of the tubular members.

U.S. Pat. No. 4,766,956 discloses an annular seal having rims which have outer lips which are curved to present a curved convex surface for sealing against the sealing surfaces to be engaged.

A sealing ring for sealing against cylindrical sealing surfaces is disclosed in the copending application of Timothy C. Davies, U.S. Ser. No. 07/189,027, filed May 2, 1988 now abandoned. The sealing ring of such application includes lips extending along the cylindrical surface and having an annular bulge near the outer ends of the lips with a relatively short flat sealing surface thereon for engaging the cylindrical sealing surface. The lip further includes an enlarged section between the root of the lip and the lip sealing surface.

Another replacement type of sealing ring disclosed in the pending U.S. application for patent of W. M. Taylor et al, Ser. No. 07/106,663, now abandoned, includes a seal body having external tapers together with a rim extending axially from the end of one of the tapers which is adapted to be press fitted into a recess to seal against the wall of the recess below a damaged tapered surface on the interior end of one of the tubular members.

SUMMARY

The present invention provides both improved joints and sealing rings for a wellhead housing in its connections to a blowout preventer during the drilling of the well, to a production tree upon completion of the well and to a side connected valve. The improved joint includes a wellhead housing and its complementary member forming the joint and they include surfaces which taper both inwardly and away from the joint surfaces together with straight cylindrical sealing surfaces extending away from the inner end of the tapered surfaces. One form of improved seal includes a sealing ring having a tubular body with an external flange or hub to be clamped between the joint surfaces of the joint members, tapered external surfaces which mate with and provide a tight sealing engagement with the tapered surfaces of the joint members and tubular rims extending away from the tapered surfaces and having sufficient length to protect the straight cylindrical sealing surfaces of the joint members. A modified form of improved seal includes a sealing ring having a tubular body with an external flange to be clamped between the joint surfaces of the joint members, and tubular rims terminating in an external rounded portion having a short annular flat sealing surface thereon for engaging the straight cylindrical sealing surfaces of the joint members at a position spaced axially from the tapered sealing surfaces of the joint members.

An object of the present invention is to provide an improved wellhead joint between a wellhead housing and a blowout preventer, a production tree or a side outlet valve having either a coining type of tapered seal or an interference fit type of seal.

Another object of the present invention is to provide an improved seal ring for sealing between a wellhead joint which provides a tapered seal and protects adjacent sealing surfaces of the joint members.

A further object of the present invention is to provide an improved seal ring for sealing between a production wellhead joint which provides an interference fit type of sealing.

BRIEF DESCRIPTION OF THE DRAWINGS

These and other objects and advantages of the present invention are hereinafter set forth and explained with reference to the drawings wherein.

DESCRIPTION OF THE PREFERRED EMBODIMENTS

Figure 1:
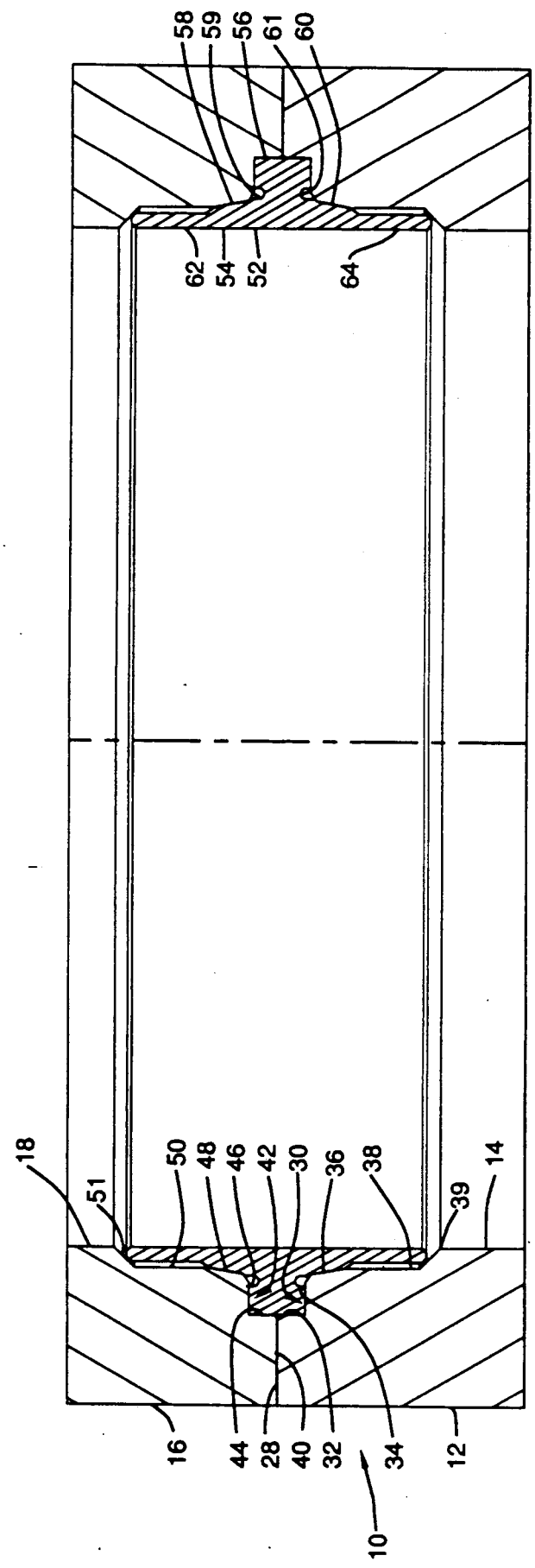
FIG. 1 is a sectional view of a wellhead during drilling and illustrating the sealing between the housing and the blowout preventer stack and the seal ring which provide the seal and protects the cylindrical sealing surfaces of the joint members.

As shown in FIG. 1, improved joint 10 is composed of two members which have aligned bores. The lower member is wellhead housing 12 having central bore 14 and the upper member is blowout preventer stack 16 having a central bore 18 aligned with central bore 14 of housing 12 The upper end of housing 12 is secured to the lower end of stack 16 by suitable clamping means (not shown).

The upper end of housing 12 includes outer joint surface 28 extending normal to the axis of central bore 14 and terminating in interior recess 30 which is defined by cylindrical shoulder 32 and upwardly facing clamping shoulder or surface 34. Tapered sealing surface 36 extends from the inner end of surface 34 and tapers downwardly and inwardly toward the axis of central bore 14. A slight relief or chamfer is provided between surfaces 34 and 36 as shown. Cylindrical surface 38 extends axially away from the inner end of surface 36 and has a diameter larger than the diameter of central bore 14. Tapered surface 39 connects the lower end of surface 38 and the upper end of bore 14.

The lower end of stack 16 includes outer joint surface 40 extending normal to the axis of central bore 18 and terminates in interior recess 42 which is defined by cylindrical shoulder 44 and clamping surface 46. Tapered sealing surface 48 extends from the inner end of surface 46 and tapers upwardly and inwardly toward the axis of central bore 18. A slight chamfer is provided between surfaces 46 and 48 as shown. Cylindrical surface 50 extends axially away from the inner end of surface 48 and has a diameter larger than the diameter of central bore 18. Tapered surface 51 connects the upper end of surface 50 to the lower end of bore 18.

Improved seal ring 52 is generally tubular in shape and includes central bore 54 which is substantially the same diameter as central bores 14 and 18, outer flange or hub 56 which has a size adapted to be contained within recesses 30 and 42 and engaged by surfaces 34 and 46. Outer surfaces of ring 52 include tapered sealing surfaces 58 and 60 extending upwardly and downwardly, respectively from hub 56, and both tapering inwardly. Tapered surfaces 58 and 60 have the same angle of taper as tapered surfaces 36 and 48 on the ends of housing 12 and stack 16 but have a slightly larger diameter so that when flange or hub 56 of ring 52 is clamped between surfaces 34 and 46, tapered surfaces 58 and 60 are forced into a tight sealing engagement with surfaces 48 and 36 which may result in the Brinnelling of the respective surfaces and avoid any sealing problems which could result from scratches in the sealing surfaces or other slight deformation of the surfaces. Relief or undercut areas 59 and 61 are provided between the ends of surfaces 58 and 60 and the radial surfaces of hub 56. The upper and lower ends of ring 52 extend axially beyond the ends of surfaces 58 and 60 to provide protecting rims 62 and 64 for protecting a substantial portion of cylindrical surface 50 in stack 16 and cylindrical surface 38 in housing 12. The distal ends of rims 62 and 64 are positioned near the ends of surfaces 50 and 38 so that during drilling and the running of equipment through bores 14 and 18, no scratching or other damage is done to surfaces 50 and 38.

Figure 2:
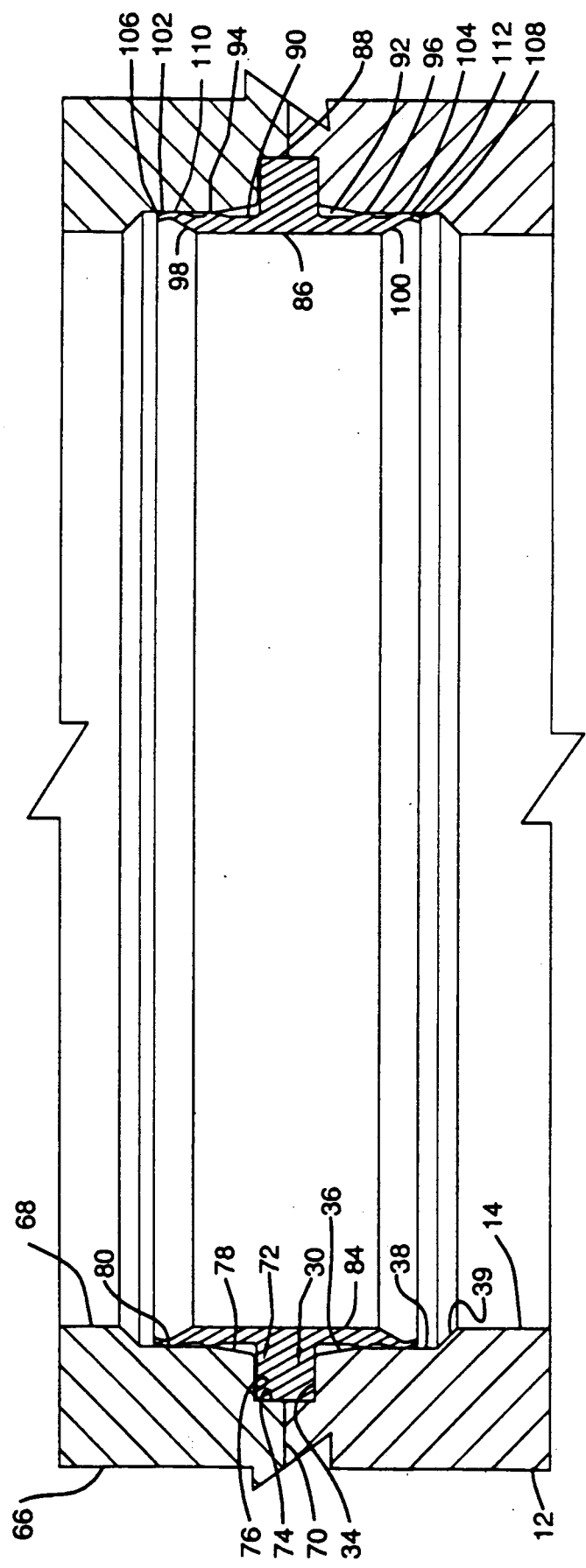
FIG. 2 is a sectional view of a wellhead after completion and illustrating the sealing between the housing and the production tree and the seal ring which provides an interference fit type of seal against the cylindrical sealing surfaces of the joint member.

When drilling and other work in the well is completed, blowout preventer stack 16 is removed and production tree 66 is installed on the upper end of housing 12 as shown in FIG. 2. Production tree 66 includes central bore 68 and has the same lower end configuration as stack 16 including outer joint face 70, interior recess 72 defined by cylindrical surface 74 and clamping surface 76, tapered surface 78 terminating in cylindrical sealing surface 80. Production tree 66 is secured to housing 12 by suitable clamping means (not shown).

Improved seal ring 84 is positioned in sealing engagement between housing 12 and production tree 66 as shown in FIG. 2. Seal ring 84 is generally tubular in shape and includes central bore 86 which is substantially the same diameter as central bores 14 and 68, outer flange or hub 88 which has a size adapted to be contained within recesses 30 and 72 and engaged by surfaces 34 and 76. Outer surfaces of ring 84 include cylindrical surfaces 90 and 92 extending upwardly and downwardly, respectively, from the base of hub 88 and having a diameter less than the diameter of the inner ends of tapered surfaces 78 and 36. Enlargements 94 and 96 extend outwardly from the end of cylindrical surfaces 90 and 92 and have maximum diameters slightly less than the diameters of cylindrical surfaces 80 and 38 and rims 98 and 100 extend from enlargement 94 and 96 and are shaped to have annular external bulges, or projections, 102 and 104 and ends 106 and 108 which are curved inwardly as shown. Sealing surfaces 110 and 112 are flat surfaces on the exterior of projections 102 and 104 which have interference fits with cylindrical surfaces 80 and 38 and have an unloaded shape which causes surfaces 110 and 112 to be parallel to surfaces 80 and 38 when they engage such surfaces in sealing engagement. As can be seen from the drawing, the outer ends 106 and 108 extend almost to the ends of cylindrical surfaces 80 and 38.

Figure 3:
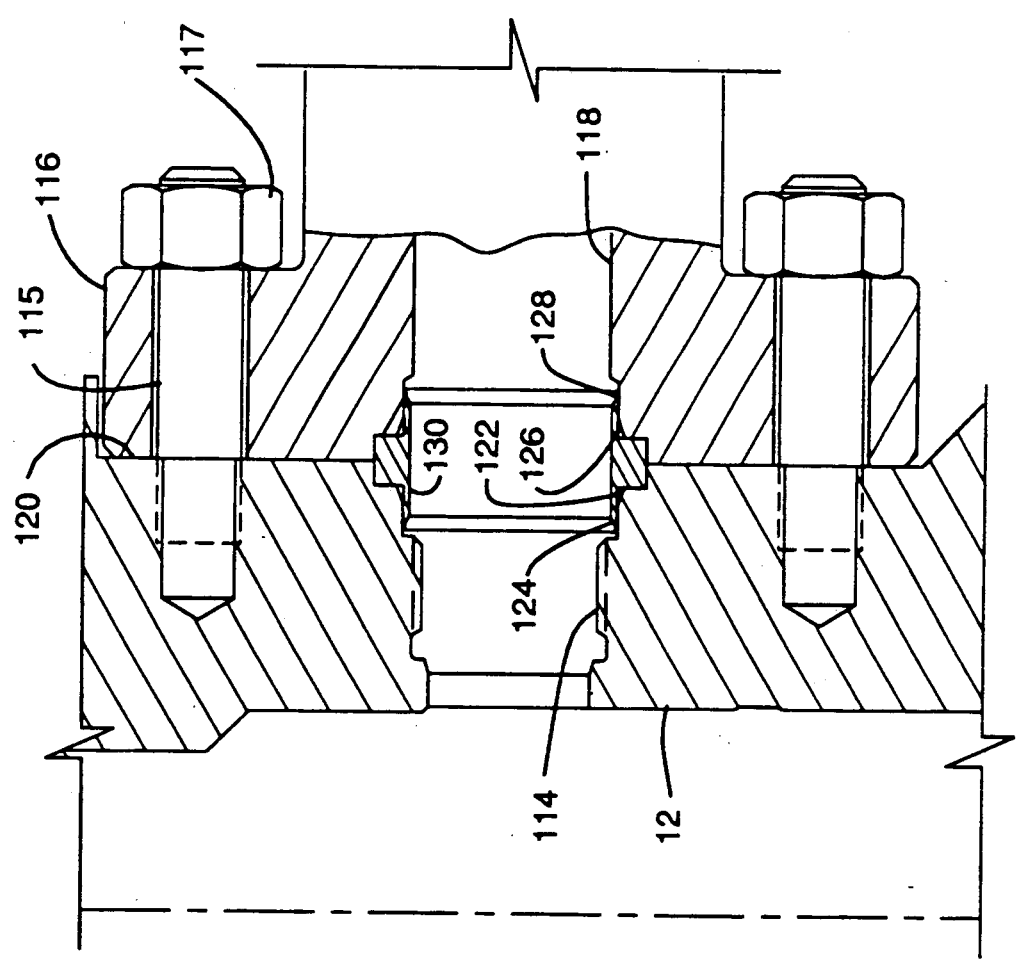
FIG. 3 is a sectional view of a wellhead housing having a side outlet with a valve mounted thereto and having the improved sealing joint of the present invention for sealing between the housing and the valve as shown in FIG. 2.

As shown in FIG. 3, wellhead housing 12 may include side opening or bore 114 with control valve 116 being secured to the side of housing 12 with its central bore 118 being in alignment with bore 114 in housing 12. Housing 12 includes recess 120 surrounding the outer end of bore 114 and in which control valve 116 is secured by suitable fastening means, such as studs 115 and nuts 117. Housing 12 is shaped around the outer end of bore 114 to include tapered surface 122 and cylindrical surface 124 which has a larger diameter than bore 114. Control valve 116 is shaped around the inner end of its central bore 118 to include tapered surface 126 and cylindrical surface 128 which has a larger diameter than bore 118. Seal ring 130 is substantially identical with seal ring 84, shown in FIG. 2 and functions to seal against cylindrical surfaces 124 and 128. It should be noted, however, that the housing 12 and valve 116 both include tapered surfaces 122 and 126 which can be used to obtain a positive seal by using a seal in place of seal ring 130 which is identical with seal ring 52 and would provide the interference fit which is provided by the tapered surfaces of seal ring 52 being slightly larger in diameter than the tapered surfaces which are engaged by the seal ring tapered surfaces.

It should be noted that an improved seal of the present invention could utilize the tapered external sealing configuration of seal ring 52 together with the external cylindrical configuration of seal ring 84 in the event that the one sealing surface is scratched or otherwise damages. This could be accomplished by including one or both of the external tapered surfaces extending from the hub. Because of the fit of such tapered sealing surfaces, a coining of the housing sealing surface would avoid problems with such scratches or other minor surface damage and thus eliminate the need to attempt hand finishing by polishing of such surface.

What is claimed is:

1. A wellhead structure comprising
a wellhead housing having a bore therethrough, an upper counterbore of larger diameter than the housing bore diameter forming an upwardly facing housing shoulder and an internal sealing surface below said shoulder having a diameter larger than the diameter of said housing bore, a member having a bore substantially the same diameter as said housing bore, a lower counterbore of larger diameter than the member bore forming a downwardly facing shoulder and an internal sealing surface above said shoulder having a diameter larger than the diameter of said member bore, said housing sealing surface including a tapered sealing surface portion extending downwardly and inwardly from said housing shoulder, a cylindrical sealing surface portion which is concentric with the axis of said central bore and a tapered surface portion which tapers downwardly and inwardly from the lower end of said parallel sealing surface portion and terminates at said housing bore, said member sealing surface including a tapered sealing surface portion extending upwardly and inwardly from said member shoulder, a cylindrical sealing surface portion which is parallel to the axis of said member bore and a tapered surface portion which tapers upwardly and inwardly from the upper end of said parallel member sealing surface and terminates at said member bore, a sealing ring having a central bore substantially the same diameter as the diameter of said housing and member bores, said central bore having an axis, an external hub having a radial dimension for engaging said housing and member shoulders and upper and lower sealing lips positioned above and below said external hub, said lower sealing lip having a tapered surface extending from said external hub and adapted to engage said tapered sealing surface portion of said housing and a surface extending axially and concentrically with said central bore axis of said sealing ring to define a tubular portion and having a diameter smaller than the diameter of the parallel portion of said housing sealing surface so than when positioned within said housing said tubular portion extends axially of said housing to protect a substantial portion of said parallel housing sealing surface, and said upper sealing lip having a tapered surface extending from said external hub and adapted to engage said member tapered sealing surface portion and a surface extending axially and concentrically with the axis of the sealing ring bore to define a tubular portion and having a diameter smaller than the diameter of the parallel portion of said member sealing surface so than when positioned within said member said tubular portion extends axially of said member to protect a substantial portion of said parallel member sealing surface, and means for securing said member to said housing.

2. A wellhead structure according to claim 1 wherein the tapered sealing surfaces on said sealing ring have diameters which provide interference fits with said tapered sealing surface portions of said housing and member surfaces.

3. A wellhead structure according to claim 1 wherein the upper lip of said sealing ring is the mirror image of said lower lip.

4. A wellhead structure comprising a wellhead housing having a bore therethrough, said bore having an axis, an upper counterbore of larger diameter than the housing bore diameter forming an upwardly facing housing shoulder and an internal housing sealing surface below said housing shoulder having a diameter larger than the diameter of said housing bore, said housing sealing surface including a tapered surface portion extending downwardly and inwardly from said housing shoulder, a cylindrical sealing surface portion which is concentric with the axis of said housing bore and a tapered surface portion which tapers downwardly and inwardly from the lower end of said cylindrical concentric sealing surface portion and terminates at said housing bore, a member having a bore therethrough, said bore having an axis, a lower counterbore of larger diameter than the housing bore diameter forming a downwardly facing member shoulder and an internal sealing surface above said member shoulder having a diameter larger than the diameter of said member bore, said member sealing surface including a tapered surface portion extending upwardly and inwardly from said member shoulder, a cylindrical sealing surface portion which is concentric with the axis of said member bore and a tapered surface portion which tapers upwardly and inwardly from the upper end of said cylindrical concentric sealing surface portion and terminates at said member bore, a sealing ring having a central bore substantially the same diameter as the diameter of said housing and member bores, an external hub having a radial dimension for engaging said housing and member counterbore shoulders and upper and lower tubular portions extending from said external hub with upper and lower sealing lips thereon, said upper and lower sealing lips; having external sealing surfaces and adapted to sealingly engage said housing and member cylindrical sealing surfaces, and means for securing said member to said housing.

5. A wellhead structure according to claim 4 wherein said lower sealing lip includes a rounded external surface near the lower end of said lip and having a diameter for sealing engagement with said concentric portion of the housing sealing surface, and said upper sealing lip includes a rounded external surface near the upper end of said upper lip and having a diameter for sealing engagement with said concentric portion of the member sealing surface.

6. A subcombination with a wellhead joint between joint members which are secured together by suitable connecting means having tapered sealing surfaces extending from their joint faces and straight cylindrical sealing surfaces extending away from the inner end of the tapered sealing surface, of a seal comprising a seal ring having an external hub, an upper rim, a lower rim and a central bore therethrough, said upper and lower rims being sufficiently long to extend along only a substantial portion of the straight cylindrical sealing surfaces of the joint members, said rims each include outer tapered surfaces for mating with the tapered sealing surfaces of said joint members and a tubular rim portion extending axially therefrom.

* * * * *